United States Patent
Klöfer

(10) Patent No.: US 7,012,437 B2
(45) Date of Patent: Mar. 14, 2006

(54) DEVICE FOR THE DETERMINATION AND/OR MONITORING OF THE FILLING LEVEL OF THE CHARGE IN A CONTAINER

(75) Inventor: Peter Klöfer, Steinen (DE)

(73) Assignee: Endress & Hauser GmbH & Co. KG, Maulburg (DE)

( * ) Notice: Subject to any disclaimer, the term of this patent is extended or adjusted under 35 U.S.C. 154(b) by 0 days.

(21) Appl. No.: 10/498,325

(22) PCT Filed: Nov. 30, 2002

(86) PCT No.: PCT/EP02/13538

§ 371 (c)(1),
(2), (4) Date: Nov. 10, 2004

(87) PCT Pub. No.: WO03/050482

PCT Pub. Date: Jun. 19, 2003

(65) Prior Publication Data

US 2005/0057264 A1    Mar. 17, 2005

(30) Foreign Application Priority Data

Dec. 11, 2001 (DE) .............................. 101 60 688

(51) Int. Cl.
*G01R 27/32* (2006.01)

(52) U.S. Cl. ...................................... 324/642; 324/644

(58) Field of Classification Search ................ 324/632, 324/639, 642, 643, 644; 333/240
See application file for complete search history.

(56) References Cited

U.S. PATENT DOCUMENTS

| 3,822,412 | A | * | 7/1974 | Carlin et al. ................. 333/256 |
| 5,936,589 | A | * | 8/1999 | Kawahata .................... 343/785 |
| 6,054,946 | A | * | 4/2000 | Lalla et al. ................. 342/124 |
| 6,662,648 | B1 | * | 12/2003 | Fehrenbach et al. ....... 73/290 V |
| 6,856,142 | B1 | * | 2/2005 | Schroth et al. ............. 324/644 |

FOREIGN PATENT DOCUMENTS

| DE | 38 17 844 A1 | 12/1989 |
| DE | 195 44 511 A1 | 5/1996 |

* cited by examiner

Primary Examiner—Walter Benson
(74) Attorney, Agent, or Firm—Bacon & Thomas

(57) ABSTRACT

The invention relates to a TDR fill level measuring device. A surface waveguide, along which the measuring signals are guided, is composed of a plurality of segments, which are arranged to telescope into, and out of, one another.

6 Claims, 1 Drawing Sheet

DEVICE FOR THE DETERMINATION AND/OR MONITORING OF THE FILLING LEVEL OF THE CHARGE IN A CONTAINER

FIELD OF THE INVENTION

The invention relates to a device for determining and/or monitoring the fill level of a fill substance in a container, or the location of the interface between two media, or phases, in a container.

BACKGROUND OF THE INVENTION

Such devices use a signal-producing unit, which produces high-frequency measuring signals, a coupling unit, and a surface waveguide, wherein the measuring signal is coupled by way of the coupling unit onto the surface waveguide and guided thereon in the direction of the fill substance, and a receiving-/evaluation-unit, which directly or indirectly determines, on the basis of the travel time of the measuring signal reflected on the surface, respectively interface, the fill level of the fill substance, or the location of the interface, in the container. Such devices are generally known under the label TDR fill level measuring devices. Used as measuring signals are either short, electromagnetic, high-frequency pulses, or bursts, (TDR method or pulse-radar method), or continuous, frequency-modulated microwaves (e.g. FMCW-radar method), guided along the surface waveguide. Known variants of waveguide are: Sommerfeld or Goubau or Lecher waveguides. TDR fill level measuring devices working on the basis of guided microwave pulses are, moreover, marketed by the assignee under the designation Levelflex.

Considered physically, a TDR measuring device makes use of the effect that a part of the guided pulse, respectively guided microwaves, is reflected at the boundary between two different media, e.g. air and oil, or air and water, due to the abrupt change (discontinuity) in the dielectric constants of the two media, and is guided over the surface waveguide back into a receiving device. The reflected fraction, i.e. the useful echo signal, is greater, the greater the difference between the dielectric constants of the two media. Using the travel time of the reflected fraction of the high-frequency pulse, respectively the FMCW-signal, i.e. the echo signals, the distance to the surface of the fill substance can be determined. With knowledge of the distance to the bottom of the empty container, the fill level of the fill substance in the container can be calculated. If an interface determination is to be performed, the measuring results enable correct determination of the location of the interface.

Measuring devices with guided, high-frequency signals (pulses, bursts or waves) distinguish themselves, compared to measuring devices that freely radiate the high-frequency pulses or waves (free-field microwave systems (FMR), respectively 'real radar systems'), by a significantly higher echo amplitude. The reason for this is that the power flow can occur completely targeted along the surface waveguide. Additionally, the measuring devices with guided high-frequency signals have a higher measuring sensitivity and measuring accuracy in the near region as compared with freely radiating antennas.

The length of the surface waveguide is usually selected such that the maximum measuring range within the container is covered. A waveguide with desired dimensions is either provided by the manufacturer, or the customer modifies the waveguide on site to the desired length. Disadvantageous in this is that a customer must limit itself to a certain measuring range, such as was ordered, or such as was chosen during the initial installation. If it is desired subsequently to modify the device for a container of different dimensions, then the required changes can be rather costly. In the worst case, a new surface waveguide must be purchased.

SUMMARY OF THE INVENTION

An object of the invention is to provide a TDR fill level measuring device having a surface waveguide that can be adapted in simple manner to any measuring range.

The object is achieved by composing the surface waveguide of a plurality of segments, which telescope into, or out of, one another, as desired. In principle, the surface waveguide of the device of the invention is constructed analogously to a telescoping antenna. Such telescoping antennas are best known both in the field of consumer electronics and in the field of automotive engineering.

In the case of the device of the invention, the effect is utilized that high-frequency measuring signals can, as well, be guided along a hollow metallic conductor. Since at least some of the segments of the surface waveguide have a hollow space in them, subsequently positioned segments can be accommodated in this hollow space. Likewise, the segments can, as required, be withdrawn, or run out, from the hollow space. Thus, without problem, the surface waveguide of the invention can be fitted to the particularly existing container dimensions, or the measuring length, as the case may be, desired by the customer. The customer is thus placed in an extraordinarily flexible position, as concerns TDR fill level measuring device inventory. Moreover, it is no longer required that the packaging must be varied, in order to handle the shipping of measuring devices of varied dimensions. It is sufficient to provide one, defined, compact packaging unit. For mounting of the TDR fill level measuring device to a container, it is naturally beneficial to be able to work with the short, consolidated unit. In this way, the installation of the TDR fill level measuring device into a container is significantly facilitated.

According to an advantageous further development of the device of the invention, it is provided that the surface waveguide is composed of flexible segments. An alternative embodiment is that wherein the surface waveguide is composed of rigid segments, with the segments being tube-shaped parts.

In this connection, it is especially advantageous, when the adjustment to the desired length of the surface waveguide occurs automatically by way of a corresponding control-/regulator-unit. Additionally, it is, of course, evident that no particles of the fill substance should be permitted to get into the intermediate spaces between the individual segments, this being preventable without difficulty by appropriate seals, these being likewise available from the above-referenced known technology.

In order to lock the segments of the surface waveguide at the desired length, the segments are provided with means, e.g. detent elements, that make the individual segments fixable in a retained position. Appropriate embodiments are likewise best taken from the referenced, known technology.

It is evident that the solution of the invention can also be used for the rod probe of a capacitive fill level measuring device.

The invention will now be explained in greater detail on the basis of the drawings, whose figures show as follows:

DESCRIPTION OF THE PREFERRED EMBODIMENTS

Figure 1:
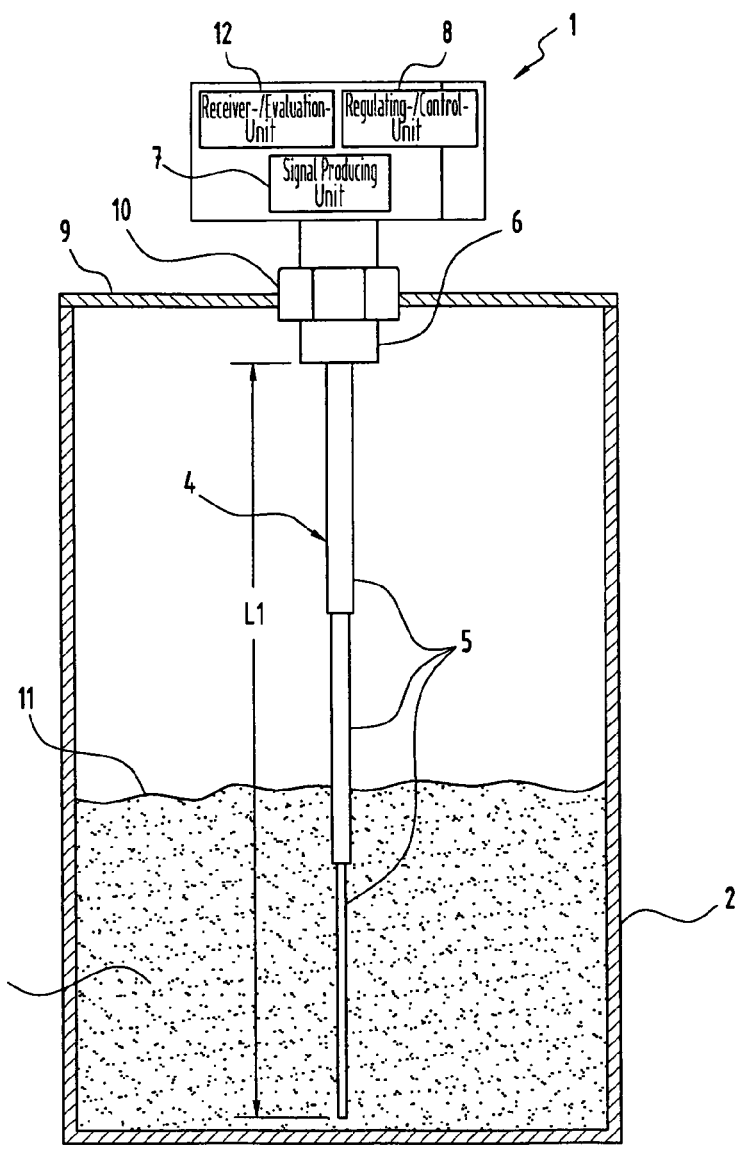
FIG. 1: a schematic drawing of a TDR fill level measuring device of the invention, having a surface waveguide of length L1.
Figure 2:
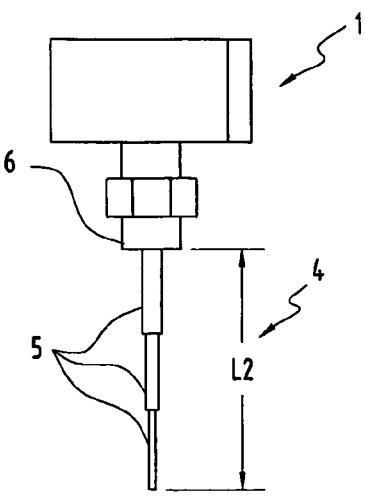
FIG. 2: a schematic drawing of a TDR fill level measuring device of the invention, having a surface waveguide of length L2.

FIGS. 1 and 2 are schematic representations of two embodiments of the TDR fill level measuring device 1. As shown in FIG. 1, the fill level measuring device 1 is secured in an opening 10 in the lid 9 of the container 2. Measuring signals, which are produced in the signal producing unit 7, are coupled by way of the coupling unit 6 onto the surface waveguide 4. Subsequently, the measuring signals travel along the surface waveguide 4 in the direction of the fill substance 3; at the surface 11 of the fill substance 3, the measuring signals are, at least in part, reflected. On the basis of the travel time of the measuring signals, the fill height of the fill substance 3 in the container 2 is determined in the receiver-/evaluation-unit 12.

The TDR fill level measuring device 1 of the invention differs from known devices by a surface waveguide 4, whose length can be adapted in simple manner for any desired container height. For this purpose, the surface waveguide 4 is composed of a plurality of segments 5, which can be telescoped into, or out of, one another, as the case may be. In both of the illustrated embodiments, the moving of the segments 5 in, or out, occurs automatically by way of the regulating-/control-unit 8.

In order to prevent particles of fill substance 3 from getting into the intermediate space between two neighbors in the series of segments 5 of the surface waveguide 4, sealing elements are provided, which are not separately shown in the figures. Also not shown separately are the detent elements, which are provided on the segments 5 for fixing these in the desired position.

The invention claimed is:

1. A device for determining and/or monitoring the fill level of a fill substance, the location of the interface between two media, or phases, in a container, comprising:

a signal producing unit, which produces high-frequency measuring signals;

a coupling unit;

a surface waveguide, and a receiver-/evaluation-unit, which directly or indirectly determines, on the basis of travel time of the measuring signal reflected from the surface, the interface of the fill material, the fill level of the fill substance, or the location of the interface, in the container, wherein:

the measuring signals are coupled onto said surface waveguide by way of said coupling unit and guided by said surface waveguide in the direction of the fill substance, and said surface waveguide includes a plurality of segments, which are arranged to telescope respectively into and out of, one another.

2. The device as claimed in claim 1, wherein:

said plurality of segments are flexible segments.

3. The device as claimed in claim 2, wherein:

said plurality of segments are rigid segments.

4. The device as claimed in claim 1, further comprising:

a regulating-/control-unit, by way of which said segments of said surface waveguide are automatically telescoped into, respectively out of, one another.

5. The device as claimed in claim 1, wherein:

detent elements are provided on said segments, for fixing said segments of said surface waveguide.

6. The device as claimed in claim 1, further comprising:

sealing elements, for preventing the intrusion of particles of the fill substance into the intermediate space between two neighbors in the series of said segments said surface waveguide.

* * * * *